United States Patent
Ohkawa

(10) Patent No.: US 10,050,719 B1
(45) Date of Patent: Aug. 14, 2018

(54) COMMUNICATION METHOD USING THE ENTANGLED STATE

(71) Applicant: Narumi Ohkawa, Kuwana (JP)

(72) Inventor: Narumi Ohkawa, Kuwana (JP)

( * ) Notice: Subject to any disclaimer, the term of this patent is extended or adjusted under 35 U.S.C. 154(b) by 0 days.

(21) Appl. No.: 15/731,634

(22) Filed: Jul. 12, 2017

(51) Int. Cl.
*H04B 10/70* (2013.01)

(52) U.S. Cl.
CPC .................................... *H04B 10/70* (2013.01)

(58) Field of Classification Search
CPC .................................................... H04B 10/70
See application file for complete search history.

(56) References Cited

U.S. PATENT DOCUMENTS

| | | | | |
|---|---|---|---|---|
| 7,822,342 | B1 * | 10/2010 | Roberts | H04L 9/0852 380/255 |
| 8,774,641 | B2 | 6/2014 | Ohkawa | |
| 2012/0237209 | A1 * | 9/2012 | Ohkawa | H04B 10/70 398/25 |
| 2012/0237210 | A1 * | 9/2012 | Ohkawa | H04B 10/70 398/25 |

OTHER PUBLICATIONS

Kae Nemoto and W.J.Munro, Nearly Deterministic Linear Optical Controlled—NOT Gate, PRL 93, 250502 (2004).
U.Leonhardt and H.Paul, Measuring the Quantum State of Light, Prog. Quant. Electr. 1995, vol. 19, pp. 89-130, p. 102.

* cited by examiner

*Primary Examiner* — Shi K Li

(57) ABSTRACT

A first photon in single-photon state is created when one of two photons created by parametric down conversion of a pump light is detected at a first detector. The first photon is divided into two components by a polarization beam splitter, and the first component is sent to a sender while the second component is sent to a receiver, with information that one of the two photons is detected. The sender selects whether he measures the first component or not according to the signal that he wants to transmit to the receiver. The second component of the first photon and a probe light enter into the second nonlinear optical medium. The receiver detects the phase modulation of the probe light caused by the interaction with the second component using homodyne detection during a first span after he receives the information from the first detector.

1 Claim, 3 Drawing Sheets

US 10,050,719 B1

COMMUNICATION METHOD USING THE ENTANGLED STATE

FIELD

The embodiments discussed herein are related to a communication method using the entangled state, and a communication method using optical Kerr effect.

BACKGROUND OF THE INVENTION

For current communication technology, telecommunication or optical fiber communication has been widely used. In the communication method that uses electricity or light, the signal transmission speed is limited below speed of light.

On the other hand, the quantum communication technology or quantum cryptography based on the principle of quantum mechanics is being actively researched.

Moreover, the quantum teleportation, reproducing a quantum state in another system, is also being researched using the entangled state. In the quantum code or the quantum teleportation, the collapse of the wave packet (decoherence) is used. The collapse of the wave packet occurs instantly when measurement is done, and a strong correlation appears in each measurement result of each part in the entangled state.

However, it is said that it is not possible to use the entangled state to send information because an individual measurement result of the entangled state is quite random and we cannot arbitrarily choose the measurement result. Therefore, even in the quantum code or the quantum teleportation, the communication process at the speed below speed of light is needed to actually send information. So the signal transmission speed becomes below speed of light.

U.S. Pat. No. 8,774,641 shows a communication method using the entangled state created from a single-photon state and the cross phase modulation (optical Kerr effect) in the nonlinear optical medium. But it is often the case that a single-photon state is created probably with relatively small probability. So, the sender and the receiver cannot know when the entangled state is created. And it is not easy to keep enough accuracy of communication because a lot of noise can be mixed in the signal.

Related references are as follows:
Quantum States of Light, SpringerBriefs in Mathematical Physics,
DOI 10.1007/978-4-431-55960-3
Prog. Quant. Electr. 1995, Vol. 19, pp.89-130
PRL 93, 250502(2004)
U.S. Pat. No. 8,774,641

BRIEF SUMMARY OF THE INVENTION

According to an aspect of the first embodiment, a communication method comprising: the step that two photons are created by parametric down conversion of a pump light in a first nonlinear optical medium, and a first photon in a single-photon state is created by the detection of one of the two photons at a first detector; the step that the first photon is divided into two components by a polarization beam splitter, and the first component is sent to a sender while the second component is sent to a receiver, with an information that one of the two photons is detected at the first detector; the step that the sender measures the first component of the first photon when he sends "1"; the step that the sender doesn't measure the first component of the first photon when he sends "0"; the step that the second component of the first photon and a probe light enter into a second nonlinear optical medium; the step that the second component of the first photon interacts with the probe light in the second nonlinear optical medium; the step that the receiver measures the phase modulation of the probe light caused by the interaction with the second component of the first photon, during first span after the receiver received the information that one of the two photons is detected at the first detector; the step that the receiver distinguishes the signal sent from the sender by utilizing the result of the measurement of the phase modulation.

DETAILED DESCRIPTION OF THE INVENTION

Communication Method of the First Embodiment

Figure 1:
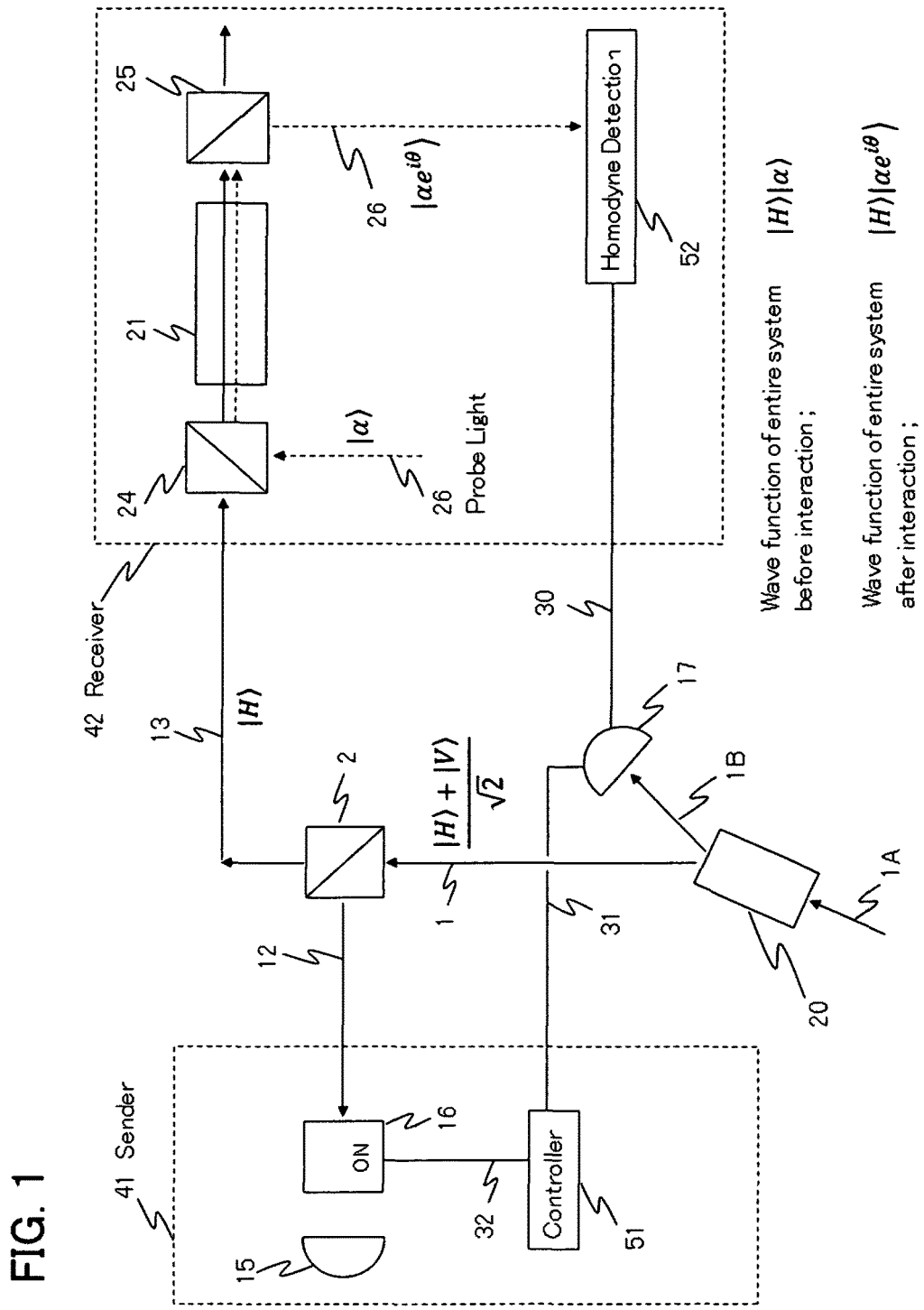
FIG. 1 is a schematic view of the instruments for the communication method of the first embodiment where the optical switch 16 is in the state "ON" that the light can pass, and the first component 12 of the first photon 1 is not detected at the second detector 15.
Figure 2:
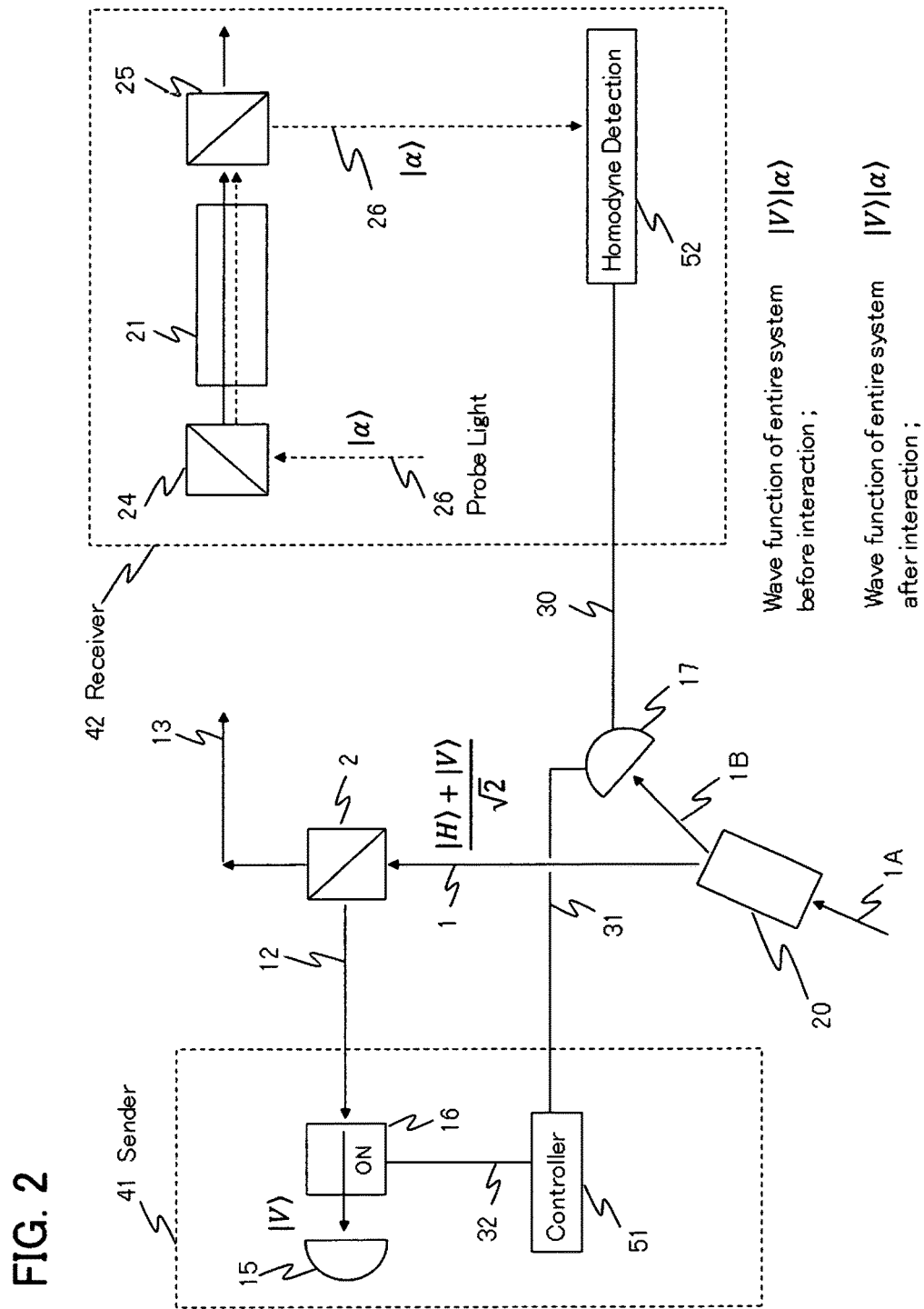
FIG. 2 is a schematic view of the instruments for the communication method of the first embodiment where the optical switch 16 is in the state "ON" that the light can pass, and the first component 12 of the first photon 1 is detected at the second detector 15.
Figure 3:
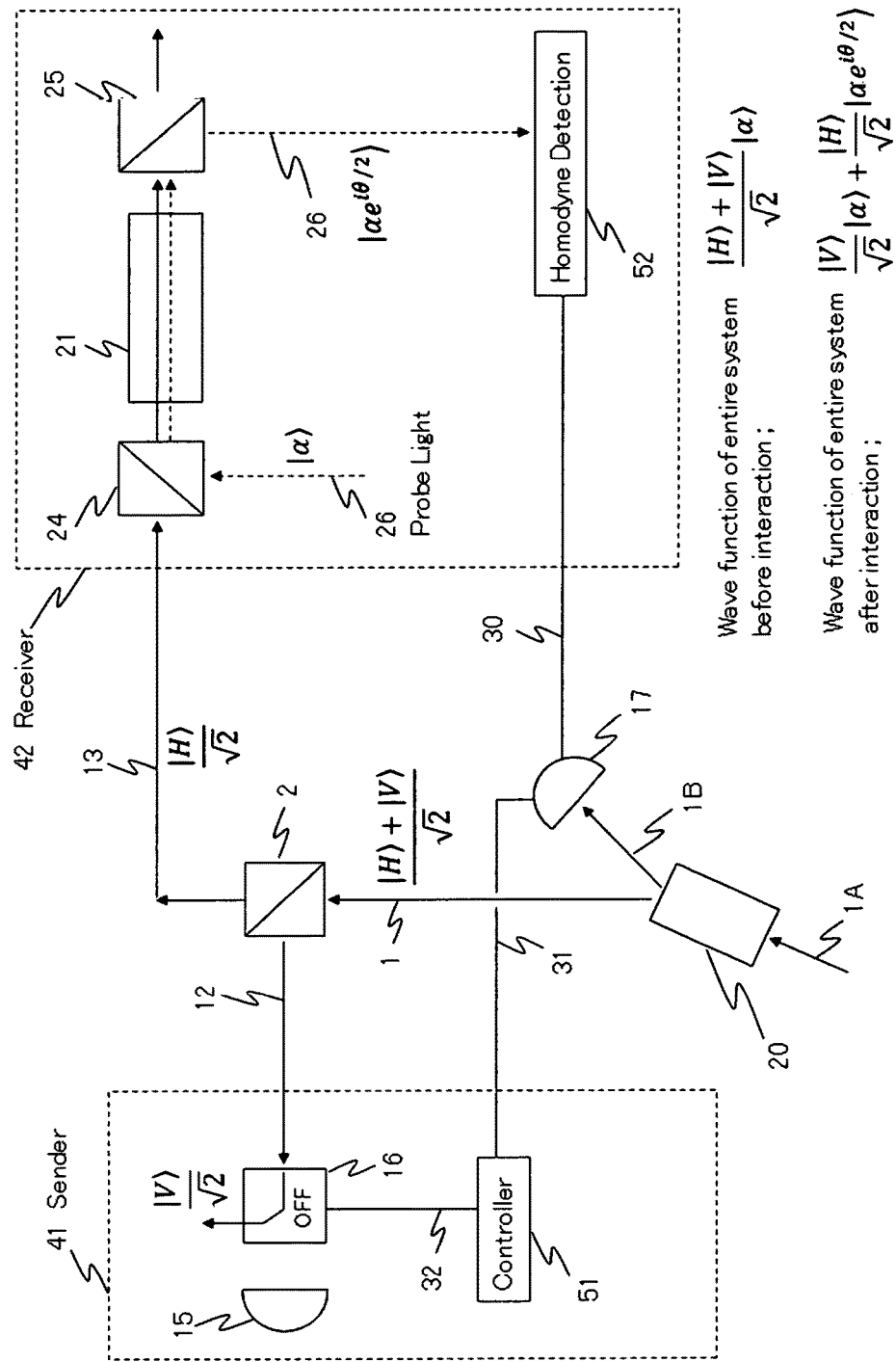
FIG. 3 is a schematic view of the instruments for the communication method of the first embodiment where the optical switch 16 is in the state "OFF" that the light is averted.

A method for communication according to the present first embodiment will be described with reference to FIGS. 1 to 3. FIGS. 1 to 3 are schematic views of the instruments according to the first embodiment. The related reference is U.S. Pat. No. 8,774,641. In FIG. 1, a dotted line 41 means instruments of a sender and a dotted line 42 means instruments of a receiver. Almost at the center between the sender and the receiver, a first nonlinear optical medium 20 and a first detector 17 and a polarization beam splitter 2 are arranged.

A pump light 1A enters into the first nonlinear optical medium 20. And, by parametric down conversion of the pump light 1A in the first nonlinear optical medium 20, a first photon 1 and a second photon 1B are created with a certain probability. The second photon 1B enters into the first detector 17. When the second photon 1B is detected at the first detector 17, we can know that the first photon 1 in the single-photon state is also created. Above method to obtain a single-photon state is explained in detail in non-patent documents, Quantum States of Light, SpringerBriefs in Mathematical Physics, DOI 10.1007/978-4-431-55960-3. And it is also explained that each photon of the two photons created by parametric down conversion can have orthogonal polarizations. When the first detector 17 detects the second photon 1B, the first detector 17 sends an information that the second photon 1B is detected to the receiver and the sender. In FIG. 1, the path of the information from the detector 17 to the receiver or the sender is shown as the line 30 or the line 31. The line 30 or the line 31 means ordinary telegraphy.

In FIG. 1, the first photon 1 in the single-photon state enters into the polarization beam splitter 2. It is assumed that the first photon 1 is in the state of 45 degrees polarization. In the polarization beam splitter 2, the first photon 1 is divided into a first component 12 with the vertical polarization and a second component 13 with the horizontal polarization. Here, the first component 12 and the second component 13 are in the entangled state. U.S. Pat. No. 8,774,641 uses a half beam splitter to divide a photon in the single-photon state. But a half beam splitter can make the vacuum fluctuation interfere with the entangled state of photon as explained in non-patent documents, Prog. Quant. Electr. 1995, Vol. 19, pp.89-130. Above method using a polarization beam splitter can divide the first photon 1 without interference caused by the vacuum fluctuation. So, above method can achieve the higher accuracy in creation of the entangled state than the method of U.S. Pat. No. 8,774,641.

In FIG. 1, the first component 12 of the first photon 1 is sent to the sender and measured at a second detector 15. An optical switch 16 is arranged just in front of the second detector 15, and the optical switch 16 is in the state "ON" that the light can pass. The sender controls the state of the optical switch using a controller 51. In FIG. 1, the sender selects the state "ON" of the optical switch 16 according to the signal "1" that the sender wants to transmit to the receiver, when the information from the first detector 17 arrives at the controller 51. The line 32 shows the path through which the command from the controller 51 to the optical switch 16 is transmitted. And the first component 12 of the first photon 1 arrives at the optical switch 16 after the state of the optical switch 16 is fixed to the state "ON" that the sender selects.

On the other hand, the second component 13 of the first photon 1 enters into the polarization beam splitter 24 after the first component 12 of the first photon 1 is measured at the second detector 15. The second component 13 of the first photon 1 passes a polarization beam splitter 24, a second nonlinear optical medium 21 and a polarization beam splitter 25.

Moreover, a probe light 26 enters into the polarization beam splitter 24. The probe light 26 has the vertical polarization, and is reflected in the polarization beam splitter 24. The probe light 26 passes the second nonlinear optical medium 21 and interacts with the second component 13 of the first photon 1 by the optical Kerr effect. Then the probe light 26 is reflected in the polarization beam splitter 25. And the probe light 26 is measured by instruments for homodyne detection 52.

The phase of the probe light 26 is changed in the second nonlinear optical medium 21. The amount of the phase modulation of the probe light 26 is proportional to the intensity of the second component 13 of the first photon 1. This phenomenon is due to the optical Kerr effect of the second nonlinear optical medium 21, and is called cross phase modulation (XPM). The amount of the phase modulation of the probe light 26 is detected by homodyne detection of the probe light 26. The detection of the amount of the phase modulation using homodyne detection is explained in detail in non-patent documents, PRL 93, 250502(2004).

In FIG. 1, instruments for the homodyne detection 52 is expressed as a box. The line 30 is connected to the instruments for the homodyne detection 52, and the instruments for the homodyne detection 52 can receive the information from the first detector 17. When the instruments for the homodyne detection 52 receive the information from the first detector 17, the second component 13 of the first photon 1 arrives at the second nonlinear optical medium 21. So, during the first span after the information from the first detector 17 arrives at the instruments for the homodyne detection 52, the probe light 26 which has the phase modulation caused by XPM enters into the instruments for the homodyne detection 52. The result of the homodyne detection during the first span after the information from the first detector 17 arrives at the instruments for the homodyne detection 52 is used for communication as follows.

The wave function of the second component 13 of the first photon 1 and the probe light 26, before the measurement at the second detector 15 is done in FIG. 1, is expressed in the following Equation 1.

$$\phi 0 = \frac{|H\rangle + |V\rangle}{\sqrt{2}} |\alpha\rangle \qquad \text{Equation 1}$$

Initial state $\Phi 0$ of the entire wave function is shown by the product of the state of the probe light 26 $|\alpha\rangle$ and the state of the first photon 1 $(|H\rangle+|V\rangle)/\sqrt{2}$. Here $|V\rangle$ shows the first component 12 of the first photon 1, and $|H\rangle$ shows the second component 13 of the first photon 1. Therefore, $|V\rangle$ and $|H\rangle$ are in the entangled state. Moreover, $|\alpha\rangle$ is the initial state of the probe light 26 which has the vertical polarization.

In the case that the first component 12 of the first photon 1 is not detected in the second detector 15 in FIG. 1, the state becomes as follows.

Equation 12 From Equation 1 to Equation 2, the state of the first photon 1 changes from $(|H\rangle+|V\rangle)/\sqrt{2}$ to $|H\rangle$, because it is fixed that $|V\rangle$ doesn't exist by the measurement at the second detector 15. Next, the second component 13 of the first photon 1 enters into the second nonlinear optical medium 21. The probe light 26 receives the phase modulation by XPM caused by the intensity of the second component 13 of the first photon 1 in the second nonlinear optical medium 21. The probe light 26 which gets out from the second nonlinear optical medium 21 is in the state $\Phi 2$ expressed by following Equation 3, where the amount of the phase modulation is assumed to be $\theta$.

$$\phi 2 = |H\rangle |\alpha e^{i\theta}\rangle \qquad \text{Equation 3}$$

Moreover, when the first component 12 of the first photon 1 is detected at the second detector 15 as shown in FIG. 2, the state of the first photon 1 is fixed to $|V\rangle$, and the state becomes $\phi 3$ shown by following Equation 4.

$$\phi 3 = |V\rangle |\alpha\rangle \qquad \text{Equation 4}$$

In this case, because the second component 13 of the first photon 1 doesn't enter into the second nonlinear optical medium 21, the probe light 26 which gets out from the second nonlinear optical medium 21 remains in the state of $\Phi 3$. And in this case of FIG. 2, the amount of the phase modulation is 0. The change of the state $\Phi 0$ into the state of $\Phi 1$ or $\Phi 3$ is called the collapse of the wave packet which occurs almost instantly at very short time by the measurement at the second detector 15.

Next, the case of FIG. 3 is explained. Optical switch 16 just in front of the second detector 15 is set to avert light up in FIG. 3 unlike the case of FIG. 1 or FIG.2. Therefore, the measurement of the first component 12 of the first photon 1 is not done and the collapse of the wave packet doesn't occur. In FIG. 3, the sender selects the state "OFF" of the optical switch 16 according to the signal "0" that the sender wants to transmit to the receiver, when the information from the first detector 17 arrives at the controller 51.

Therefore, the second component 13 of the first photon 1 enters into the second nonlinear optical medium 21, while the second component 13 of the first photon 1 is in the state of $|H\rangle/\sqrt{2}$. The probe light 26 receives the phase modulation in the second nonlinear optical medium 21 by XPM caused by the second component 13 of the first photon 1. And the amount of the phase modulation becomes $\theta/2$ for FIG. 3. The factor $\sqrt{1/2}$ comes from the intensity of the second component 13 of the first photon 1 in the state of $|H\rangle/\sqrt{2}$, because the first photon 1 is divided in two components. Therefore, the probe light 26 which gets out from the second nonlinear optical medium 21 is in the state Φ4 shown by the following Equation 5.

$$\phi 4 = \frac{|V\rangle}{\sqrt{2}}|\alpha\rangle + \frac{|H\rangle}{\sqrt{2}}|\alpha e^{i\theta/2}\rangle \quad \text{Equation 5}$$

In this case, the collapse of the wave packet occurs when the amount of the phase modulation of the probe light 26 is measured using homodyne detection. Then the phase modulation is 0 or θ2.

In the case of FIG. 1, the probe light 26 which gets out from the second nonlinear optical medium 21 is in the state) $|\alpha e^{i\theta}\rangle$. So, the amount of the phase modulation of the probe light 26 is θ. In the case of FIG. 2, the amount of the phase modulation of the probe light 26 is 0. So, when the measurement of the first component 12 of the first photon 1 is executed as shown in FIG. 1 or FIG. 2, the amount of the phase modulation of the probe light 26 is 0 or θ.

In the case of FIG.3, the probe light 26 which gets out from the second nonlinear optical medium 21 is in the state of $|\alpha\rangle$ or $|\alpha e^{i\theta/2}\rangle$. So, the amount of the phase modulation of the probe light 26 is 0 or θ2. These amount of the phase modulation 0 or θ or θ/2 can be detected using the technique that is called homodyne detection as explained in detail in non-patent documents, PRL 93, 250502(2004). Therefore, the case of FIG. 1, FIG. 2 and the case of FIG. 3 can be distinguished.

Moreover, in the case of FIG. 1, FIG. 2 and FIG. 3, the receiver can know when the second component 13 of the first photon 1 enters into the second nonlinear optical medium 21 by the information that the photon 1B is detected at the first detector 17. The information also means that the second component 13 of the first photon 1 arrives at the second nonlinear optical medium 21 and interacts with the probe light 26. And the receiver uses the result of homodyne detection during the first span after he receives the information to distinguish the signal sent from the sender. This can improve the accuracy of communication because the receiver can reject the result of homodyne detection during a second span that the interaction (XPM) doesn't occur. The result of the homodyne detection during the second span that the interaction (XPM) doesn't occur acts as noise. The communication method of U.S. Pat. No. 8,774,641 doesn't use the information when the interaction (XPM) between the second component 13 of the first photon 1 and the probe light 26 occurs. So, above method of communication has the advantage of higher accuracy compared to the method of U.S. Pat. No. 8,774,641.

In above discussion, the difference between the amount of the phase modulation θ and θ/2 comes from the change of the wave function (collapse of the wave packet) by the measurement at the second detector 15. The collapse of the wave packet is a basic concept of the Copenhagen interpretation of the quantum mechanics. So this method also shows the method to observe the change of wave function by the collapse of the wave packet.

A method of communication using the above-mentioned composition is explained here. Two photons are created by parametric down conversion of the pump light 1A in the first nonlinear optical medium 20. And the first photon 1 in single-photon state is created when one of the two photons, the photon 1B, is detected at the first detector 17. And, the first photon 1 is divided into two components by the polarization beam splitter 2. The first component 12 of the first photon 1 is sent to the sender and the second component 13 of the first photon 1 is sent to the receiver, with the information that the photon 1B is detected at the first detector 17.

The sender selects the state of an optical switch 16 arranged just in front of the second detector 15 according to the signal that he wants to transmit to the receiver, when he receives the information that the photon 1B is detected. The optical switch 16 is set in the state "ON" that the light can pass and the sender measures the first component 12 of the first photon 1 in the case that the sender transmits "1" at time 1. Moreover, in the case that the sender transmits "0", the first component 12 of the first photon 1 is prevented from advancing to the second detector 15 by the optical switch 16 which is set in the state "OFF" that the light is averted, and the sender doesn't measure the first component 12 of the first photon 1.

The second component 13 of the first photon 1 enters into the nonlinear optical medium 21 at the time 2 after the time 1. The probe light 26 enters into the nonlinear optical medium 21 at the same time. The second component 13 of the first photon 1 interacts with the probe light 26 in the second nonlinear optical medium 21. As a result, the probe light 26 which gets out from the second nonlinear optical medium 21 gets the phase modulation proportional to the intensity of the second component 13 of the first photon 1.

The receiver measures the phase modulation of the probe light 26 during the first span after he receives the information that the photon 1B is detected. This means that the receiver can measure the phase modulation of the probe light 26 only when the interaction between the second component 13 of the first light 1 and the probe light 26 is expected to occur by utilizing the information from the first detector 17. And the receiver knows that the signal is "1" in the case that the phase modulation is θ. Moreover, the receiver knows that the signal is "0" in the case that the phase modulation is θ/2. When the detected phase modulation is 0, the receiver cannot know the signal. But by repeating above sequence, the receiver can distinguish the signal with enough accuracy because the phase modulation isn't 0 with ½ probability.

In the above-mentioned method, two selections whether the sender measures the first component 12 of the first photon 1 or not are used for communication. Because the measurement result is not used to transmit the information, the randomness of measurement result doesn't matter. The collapse of the wave packet (decoherence) by the measurement is assumed to occur almost instantly at very short time. Therefore, the signal transmission speed beyond speed of light can be achieved in principle.

What is claimed is:
1. A method for communication comprising;
   a first step that two photons are created by parametric down conversion of a pump light in a first nonlinear optical medium, and a first photon in single-photon state is created when one of the two photons is detected at a first detector;
   a second step that the first photon is divided into two components by a polarization beam splitter, and the first component of the first photon is sent to a sender, and the second component of the first photon is sent to a receiver, with information from the first detector that one of the two photons is detected;
   a third step that the sender measures the first component of the first photon in the case that the sender sends a signal "1", while the sender does not measure the first component of the first photon in the case that the sender sends a signal "0", when the sender receives the information;

a fourth step that the second component of the first photon enters into a second nonlinear optical medium, and the second component of the first photon interacts with a probe light by cross phase modulation in the second nonlinear optical medium, where the fourth step is executed after the third step is completed;

a fifth step that the receiver measures a phase modulation of the probe light caused by the interaction with the second component of the first photon using homodyne detection during a first span after the receiver receives the information;

a sixth step that the receiver knows that the signal is "1" in the case that the phase modulation of the probe light is a first value which isn't zero, while the receiver knows that the signal is "0" in the case that the phase modulation of the probe light is half the first value, where the sixth step is executed after a sequence from the first step to the fifth step is repeated multiple times.

\* \* \* \* \*

UNITED STATES PATENT AND TRADEMARK OFFICE
CERTIFICATE OF CORRECTION

PATENT NO. : 10,050,719 B1
APPLICATION NO. : 15/731634
DATED : August 14, 2018
INVENTOR(S) : Narumi Ohkawa Page 1 of 1

It is certified that error appears in the above-identified patent and that said Letters Patent is hereby corrected as shown below:

In the Specification

Column 4, Line 25, now appears as follows:
Equation Φ1 = F}dm }Equation 1 to Equation 2, the state of the first photon 1
And should be changed to:
Φ1 = |H> |α>        Equation 2
From Equation 1 to Equation 2, the state of the first photon 1

Column 5, Line 14 and Line 26, for "θ2", each occurrence, should read "θ/2".

Signed and Sealed this
Twenty-sixth Day of February, 2019

Andrei Iancu
*Director of the United States Patent and Trademark Office*